United States Patent [19]

Heppke et al.

[11] Patent Number: 4,818,076
[45] Date of Patent: Apr. 4, 1989

[54] COLOR-SELECTIVE CIRCULAR POLARIZER AND ITS USE

[75] Inventors: Gerd Heppke; Feodor Oestreicher, both of Berlin, Fed. Rep. of Germany

[73] Assignee: Merck Patent Gesellschaft Mit Beschränkter Haftung, Darmstadt, Fed. Rep. of Germany

[21] Appl. No.: 60,810

[22] Filed: Jun. 12, 1987

Related U.S. Application Data

[63] Continuation of Ser. No. 638,454, Aug. 1, 1984, abandoned.

[30] Foreign Application Priority Data

Dec. 2, 1982 [DE] Fed. Rep. of Germany ....... 3244885

[51] Int. Cl.[4] .............................................. G02F 1/137
[52] U.S. Cl. .................................. 350/346; 350/331 R
[58] Field of Search ................... 350/349, 346, 331 R, 350/330, 350 S, 350, 351, 352

[56] References Cited

U.S. PATENT DOCUMENTS

4,525,032 6/1985 Hilsum ............................ 350/331 R

OTHER PUBLICATIONS

"Liquid Crystals", by Brown et al. of Jan. 31, 1983, C&EN.
Armitage et al., "Liquid Crystal Blue Phase to Isotropic Transition and Electric Field Response", Mol. Cryst. Liq. Cryst., vol. 64 (Letters), pp. 41–51.
Fedak et al., "Electric Field Induced Changes in the Selective Reflection Band of Cholesteric Liquid Crystals", Mol. Cryst. Liq. Cryst., vol. 64 (Letters), pp. 69–79.
Finn et al., "Cholesteric Blue Phases in Mixtures and in an Electric Field", Mol. Cryst. Liq. Cryst., 1982, vol. 84, pp. 159–192.
Hansen et al., "Liquid Crystal Media for Electron Beam Recording", IEEE Transactions on Electron Devices, vol. Ed-15, No. 11, Nov. 1968.
Schiekel, Manfred, "Ein—und Vielfarbig Anzeigende Elemente mit Nematischen Fluessigkristallen auf der Basis des DAP-Effeckts", Tech. Mitt. AEG-Telefunken 62, (19/2), 3, pp. 113–119.

Primary Examiner—Arthur G. Evans
Attorney, Agent, or Firm—Millen & White

[57] ABSTRACT

The circular polarizer comprises a liquid crystal cell, the liquid crystal layer (8) of which is present as a so-called "blue phase" and can be exposed to a variable electric field. The blue phase is an optically isotropic chiral phase which, like the cholesteric phase, reflects circularly polarized light within a narrow frequency band and accordingly, in this spectral region, transmits only light which is circularly polarized (in the opposite sense). Under the influence of the field, the reflection band changes its position and can be shifted almost continuously from blue to red by means of relatively small voltage changes.

The circular polarizer can, by means of simple additional measures, for instance by including a color-neutral circular polarizer, be developed into a color modulator and, in particular, it also makes a multi-colored display of information possible.

17 Claims, 5 Drawing Sheets

COLOR-SELECTIVE CIRCULAR POLARIZER AND ITS USE

This is a continuation of application Ser. No. 638,454 filed Aug. 1, 1984 now abandoned.

BACKGROUND OF THE INVENTION

The invention relates to a circular polarizer with voltage-controlled color selection. The polarizer comprises a liquid crystal cell with two carrier plates which are provided on their mutually facing sides with electrically conductive coatings (electrodes), and which enclose between them a chiral, color-selectively reflecting liquid crystal layer. Such an arrangement is known from Mol. Cryst. Liq. Cryst. Lett. 64 (1980) 69.

When their molecules are in a planar orientation, cholesteric liquid crystals show a characteristic optical effect, namely that they reflect light within a narrow frequency band which usually spans only a few nanometers. The reflected light is circularly polarized, namely in the same rotational sense as that in which the liquid crystal molecules are twisted relative to one another. The reflection maximum lies at a wavelength $\lambda_{max}$ which, with perpendicular incidence of the light, corresponds to the pitch of the liquid crystal helix and decreases with increasing angle of incidence. The transmission behavior of these liquid crystals is complementary, that is to say, in a spectral region centered around $\lambda_{max}$, the only light which is allowed to pass through is that which is circularly polarized in the sense opposite to that of the reflected radiation. Light of other colors passes through unaffected.

The wavelength of the reflection maximum depends not only on the direction of observation, but reacts also to temperature changes and, above all, can also be varied by applying an electric voltage, as has been known for a long time (IEEE Trans.on Electron Devices ED-15 (1968) 896). This electro-optical effect, in itself, makes a number of interesting applications possible, for example in the field of metrology or, for instance, in the recording and reproduction of images, but it has hitherto been unable to find acceptance in practice. The main reason is that the reflection band can in principle be shifted only within relatively narrow limits; thus, the literature reference quoted above reports $\lambda_{max}$ shifts which, in spite of careful selection of the liquid crystal, do not exceed 30 nm. Moreover, it is also rather difficult to give the liquid crystal a planar texture which remains table and free from disturbances even under the action of a field.

The choice of colors becomes wider when a cell with a nematic liquid crystal between crossed linear polarizers is used instead, and the birefringence properties of the liquid crystal are changed by means of the electric voltage (Techn. Mitt. AEG-Telefunken 62 (1972)3). Even here, however, the liquid crystal molecules must be uniformly preoriented. A further difficulty is that useful results are obtained only if the liquid crystal layer is illuminated with a bundle of parallel rays and has a thickness within an extremely narrow tolerance.

Starting from this state of the art, it is the object of the invention to indicate a color-selective circular polarizer based on liquid crystals, which can be modulated within relatively wide limits and, in addition, can be produced without excessive costs. To achieve this object, it is proposed, according to the invention, that in an arrangement of the type described above, the chiral liquid crystal layer be converted to an optically isotropic phase.

This phase, for which the term "blue phase" (BP) has become accepted in the meantime, has been intensively investigated in recent years. The phenomena observed hitherto are extraordinarily complex, and some of them are difficult to interpret, so that the conditions under which a BP is formed, and the way in which its molecules are ordered, are in reality not yet fully known. It is not even certain whether the blue phase is an independent phase in the strict sense, or whether merely a special texture of the cholesteric phase is involved. However, disregarding this question which has not yet been elucidated, the BP can be unambiguously identified.

The BP occurs when certain chiral systems are warmed, starting from the cholesteric phase, or are cooled, starting from the isotropic phase. It is stable within a narrow temperature range, which is at most a few degrees Centigrade wide, below the clear point. The BP is at most weakly birefringent or not at all; on the statistical mean, its molecules are distributed isotropically. There are at least two distinguishable, three-dimensionally ordered BP modifications, of which one (BPI) predominates at lower temperatures, while the other (BPII) predominates at higher temperatures. During the cholesteric/BPI and BPI/BPII transitions—both being probably first-order transitions—the entropy changes only very slightly; by contrast, the entropy difference during the BPII/isotropic transition is large. Both types of blue phase show the selective reflection which is familiar from the cholesteric phase, the reflection maxima lying at different wavelengths, which in general are shifted towards the red relative to $\lambda^{chol}_{max}$; $\lambda^{BPI}_{max} > \lambda^{BPII}_{max} > \lambda^{chol}_{max}$ frequently applies. A detailed description of the blue phase is to be found in the monograph "Liquid Crystals of One- and Two-Dimensional Order" Springer Verlag, 1980, pages 161-175, edited by W. Helfrisch and G. Heppke.

SUMMARY OF THE INVENTION

Surprisingly, it has now been found that the reflection bands of both BP types are voltage-dependent. $\lambda^{BPI}_{max}$ and $\lambda^{BPII}_{max}$ can, for example, steadily increase, as an increasing electric voltage is applied to the electrodes of the two carrier plates. If a liquid crystal with $\Delta\epsilon > 0$ in the BPI state, the system changes with increasing voltage first into the cholesteric phase and then into the homeotropic-nematic phase. Starting with this liquid crystal in the BPII phase, it passes first through the BPI phase before entering the cholesteric phase and finally the homeotropic-nematic phase. This means that, if a suitable working temperature is selected, at least two different reflection bands can be covered solely by varying the voltage. Experiments have shown that the variation ranges of $\lambda^{BPI}_{max}$ and $\lambda^{BPII}_{max}$ can extend over much more than 100 nm and have a virtually continuous transition. Under favorable conditions, almost the entire visible spectrum can be swept with a relatively small voltage shift. Remarkably, the effect which has been discovered occurs even if the liquid crystal layer has not been given a defined molecular orientation. An (oblique) homogeneous or (oblique) homeotropic wall orientation at most influences the position of the reflection bands, this is an effect which can be wholly desirable in an individual case. Apart from this, the selective reflection can be realised relatively easily with uniform, well-defined values even over large areas; optical disturbances, say the disclination lines, which are frequenctly unavoidable in cholesteric phases, do not occur.

It is known per se that the reflection spectrum of the BP reacts in a comparatively sensitive manner to changes in temperature and pressure. The blue phase has also already been investigated in an electric field (Mol. Cryst. Liq. Cryst. Lett. 64 (1980) 41 and Mol. Cryst. Liq. Cryst. 84 (1982), 159), but no influence on the selective reflection was reported. This is presumably attributable to the fact that the electric field had hitherto been used only for other purposes, namely for producing phase transitions, and the present effect becomes conspicuous only if hydrodynamic instabilities are avoided and non-reflected light fractions are filtered out.

From the data hitherto determined, it can be concluded that the measured shift of the reflection band is a pure field effect. It is particularly pronounced when an alternating voltage in the audio-frequency range is used, the blue phase exists over a wide temperature range with finite intervals in which only one of the two BP modifications is formed, the pitch of the chiral substance is relatively small and remains below a critical value, depending on the molecular arrangement, between 380 nm and 540 nm and, in other respects, is of such dimensions that the BP reflection bands lie in the visible spectrum. These requirements can readily be met if one or more nematic components are mixed with one or more chiral components. However, individual chiral compounds can also be used.

A polarizer according to the invention can operate either in reflection or in transmission. If a color-neutral circular polarizer is also added, which only allows that light which is circularly polarized in the same sense as the selectively reflected light, a circular polarizer with a variable stop band is obtained in transmitted-light operation and a controllable selective mirror is obtained in reflected-light operation. By segmenting their electrodes, these arrangements can be developed into display devices which supply visual signals in any desired pure colors.

Preferably, at least one of the two carrier plates of the circular polarizer according to the invention carries on its inner surface an orientation layer which uniformly orients the adjacent liquid crystal molecules.

Moreover, those circular polarizers according to the invention are preferred in which the liquid crystal layer consists of a liquid crystal having a pitch which corresponds to the wavelength region of the light.

The subject of the present invention is therefore a circular polarizer with voltage-controlled color selection, which comprises a liquid crystal cell with two carrier plates which are provided on their mutually facing sides (inner surfaces) with electrically conductive coatings (electrodes) and enclose between them a chiral, color-selectively reflecting liquid crystal layer, and which is characterized in that the chiral liquid crystal layer (8) is present as an optically isotropic phase, in particular a color-selective circular polarizer, in which an electric voltage can be applied to its electrodes (6, 7) of the two carrier plates (2, 3). A further subject of the invention is a color-selective circular polarizer according to the invention, the liquid crystal layer (8) of which comprises liquid crystals having a pitch which corresponds to the wavelength region of the light.

A further subject of the invention is a color-selective circular polarizer according to the invention, which carries, in front of or behind the liquid crystal layer (8), a color-neutral circular polarizer which only allows light to pass, which is circularly polarized in the same sense as the light which has been color-selectively reflected by the liquid crystal layer (8), and is operated in reflection or in transmission.

A further subject of the invention is a color-selective circular polarizer according to the invention, wherein at least the electrode of one of the two carrier plates (2, 3) is composed of part electrodes (6) which can be activated separately.

The use of one of these color-selective circular polarizers as an electro-optical component is also a subject of the invention.

BRIEF DESCRIPTION OF THE DRAWINGS

The invention will now be explained in more detail by reference to illustrative embodiments in conjunction with the attached drawing, in which.

DETAILED DESCRIPTION OF THE DRAWINGS

Figure 1:
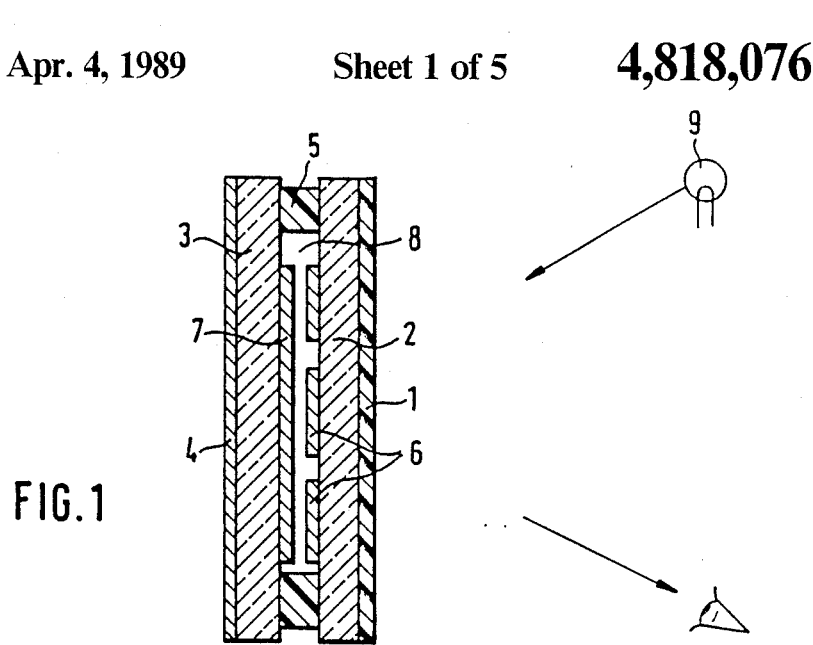
FIG. 1 shows a liquid crystal display according to the invention, in a somewhat schematized lateral section.

The display of FIG. 1 is used for representing multi-digit numbers. In detail, it comprises a circular polarizer 1, a front carrier plate (front plate) 2, a rear carrier plate (rear plate) 3 and a heating foil 4. The two plates are mutually joined, making a sealed unit, and are each provided with thin-film electrodes on their inner surfaces. The electrode on the front plate consists of segments 6 which can be activated separately, whereas the electrode on the rear plate(rear electrode) 7 is formed in one piece. The chamber formed by the frame 5 and the two plates 2, 3 is filled with a chiral liquid crystal layer 8. The layer 8 reflects light which is circularly polarized in the right-handed sense, and the polarizer 1 allows light which is polarized in this sense to pass. The display is illuminated by a light source 9.

The display operates in the following way:

The radiation emitted by the light source 9 passes through the polarizer 1 and, circularly polarized, strikes the liquid crystal layer 8. The layer reflects color-selectively, namely in a first color in the display elements which are switched on, and in a second color both in the display elements which are switched off and over the entire remaining area. The reflected light is still circularly polarized in the right-handed sense; it passes through the polarizer 1 and re-emerges at an angle which corresponds substantially to the angle of incidence. Some of the unreflected radiation escapes rearwards, and some is specularly reflected at the surfaces of the elements 3, 4 and 7. As distinct from the selectively reflected light, the specularly-reflected light is circularly polarized in the left-handed sense, and is intercepted by the polarizer 1. As a result, a colored image is formed, on a background of a different color. Should the color contrast be impaired by reflections on the front of the polarizer 1, it is advisable to bloom this component and/or to observe the display from a slightly different direction.

Within the scope of the invention, the composition of the liquid crystal layer can vary very widely. A large variety of liquid crystals is available to an expert, from the state of the art. They can be selected by routine methods. Normally, the liquid crystal layer comprises a liquid crystal comprising 1 to 15, preferably 2 to 12 liquid crystal components, which include at least one chiral component. The other constituents are preferably selected from the nematic or nematogenic substances, in particular the known substances, for example from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis cyclohexylbenzenes, 4,4'-bis-cyclohexylbiphenyls, phenyl- or cyclohexyl-pyrimidines, phenyl- or cyclohexyldioxanes, substituted or unsubstituted halogenated stilbenes, benzyl phenyl esthers, tolanes and substituted cinnamic acids.

The most important compounds, which can be used as constituents of such liquid crystal layers, can be characterized by the formula I,

R'-L-G-E-R''       I wherein L and E each are a carbocyclic or heterocyclic ring system selected from the groups comprising 1,4'-disubstituted benzene and cyclohexane rings, 4,4'-disubstituted biphenyl, phenylcyclohexane and cyclohexylcyclohexane systems, 2,5-disubstituted pyrimidine and 1,3'-dioxane rings, 2,6-disubstituted naphthalene, dihydro- and tetrahydro-naphthalene, quinazoline and tetrahydroquinazoline, G is

—CH=CH—

—CH=CY—

—C≡C—

—CO—O—

—CO—S—

—CH=N—

—N(O)=N—

—CH=N(O)—

—CH$_2$—CH$_2$—

—CH$_2$—O—

—CH$_2$—S—

—COO—Phe—COO— or a C—C single bond, Y is halogen, preferably chlorine, or —CN, and R' and R'' are alkyl, alkoxy, alkanoyloxy or alkoxycarbonyloxy having up to 18, preferably up to 8, carbon atoms, or one of these radicals can also be CN, NC, NO$_2$, CF$_3$, F, Cl or Br.

In most of these compounds, R' and R'' differ from one another, one of these radicals being an alkyl group or alkoxy group in most cases. However, other variants of the envisaged substituents are also usual. Many such substances, or even mixtures of these, are commercially available. All these substances can be prepared by methods known from the literature.

The chiral components employed can in principle be any known cholesteric and/or nematic-cholesteric liquid crystal compounds. The most important compounds which can be used as the chiral components can likewise be characterized by the Formula I, but at least one of the radicals R' and R'' therein is appropriately branched. Preferably, however, these optically active compounds do not contain more than one branched radical. As a rule, branched groups of this type do not contain more than one chain branch. Preferred branched radicals R' and R'' are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl and 3-oxa-4-methylpentyl.

The following examples are intended to explain the invention, without restricting it.

EXAMPLE 1

The liquid crystal layer comprises the nematic mixture "ZLI 1612" from Messrs. Merck 12% by weight of p-trans-4-propylcyclohexyl-benzonitrile, 30% by weight of p-trans-4-pentylcyclohexyl-benzonitrile, 20% by weight of 4-pentyl-4'-cyanobiphenyl, 10% by weight of 4-cyano-4'-(trans-4-pentylcyclohexyl)biphenyl, 10% by weight of 4-p-cyanophenyl-4'-pentyl-biphenyl and 18% by weight of trans-4-propylcyclohexyl p-trans-4-butylcyclohexylbenzoate, to which 59.7% by weight of the chiral compound "CB 15" (2-methylbutyl-4'-cyanobiphenyl) from Messrs. BDH have been added. This multi-component mixture is cholesteric at temperatures below 20.5° C. and isotropic above 23.8° C., and is in the BPI state at temperatures between 20.5° C. and 22.4° C., and in the BPII phase between 22.4° C. and 23.8° C. The selectively reflected light is circularly polarized in the right-handed sense.

Figure 2:
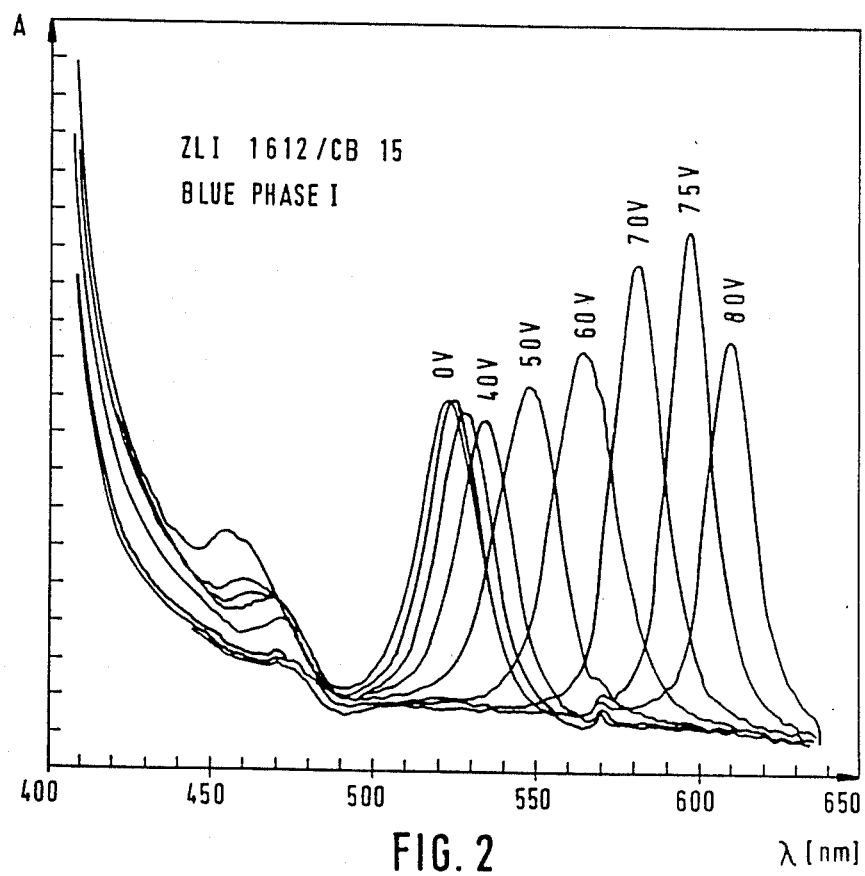
FIG. 2 shows the absorption spectra of this display, for selected voltage values at a temperature $T_1$, at which the liquid crystal layer is in the BPI state.

FIG. 2 shows the absorption (=reflection) spectrum of the liquid crystal substance at 22.3° C., at which temperature the mixture is thus still just present as the blue phase I. The absorption A measured in arbitrary units is plotted over the wavelength. The liquid crystal layer measured was 20 μm thick, and a 1 kHz alternating voltage was applied to it. It can be seen from the Figure that, with increasing voltage amplitude, the band maximum shifts from 520 nm (0 V) to 605 nm (80 V). On increasing the voltage further, the cholesteric phase forms, which can finally be twisted up further, to form the homeotropically oriented nematic phase.

Figure 3:
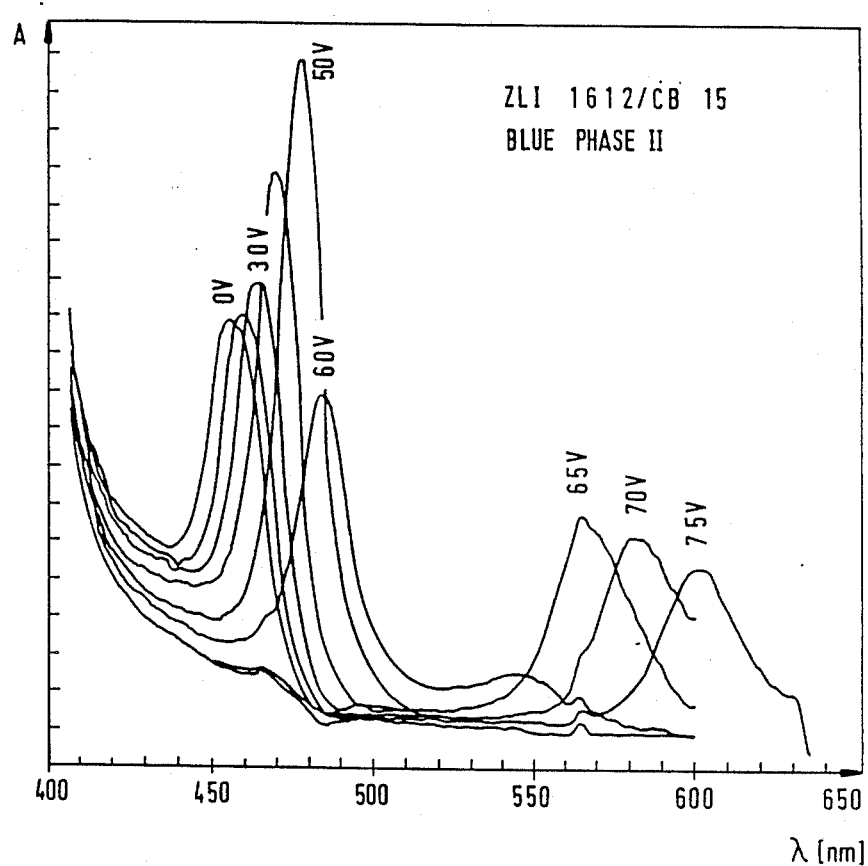
FIG. 3 shows the relationships illustrated in FIG. 2, at a temperature $T_2$ within the range over which the blue phase II exists.

When the measurements are repeated at 23.4° C., at which temperature the liquid crystal assumes the BPII state, $\lambda_{max}$ drifts from 455 nm (0 V) to 490 nm (60 V), as can be seen from FIG. 3. At higher voltage values, conversion to the blue phase I takes place and, in this state, $\lambda_{max}$ increases from 520 nm (65 V) to 600 nm (75 V).

Figure 4:
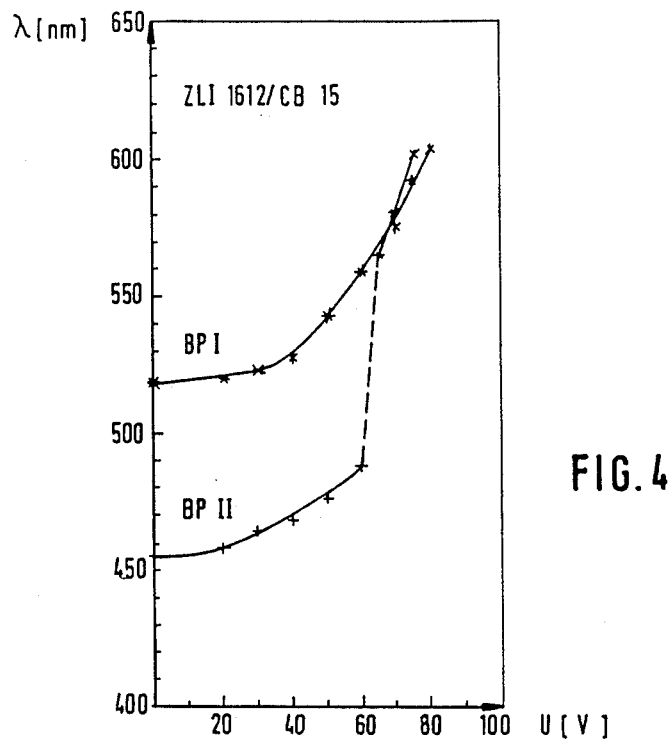
FIG. 4 shows the $\lambda_{max}$ values taken from FIGS. 2 and 3, as a function of the voltage.

In FIG. 4, $\lambda^{BPI}_{max}$ and $\lambda^{BPII}_{max}$ are again represented, as functions of the voltage applied. It will be seen that most of the spectral colors can be activated.

EXAMPLE 2

62.3% by weight of "CB 15" are admixed to the nematic substance "RO-TN 404" from Hoffmann-LaRoche. The mixture is cholesteric up to 23.7° C. and isotropic from 27.7° C., and has a BPI/BPII phase transition at 26° C.

Figure 7:
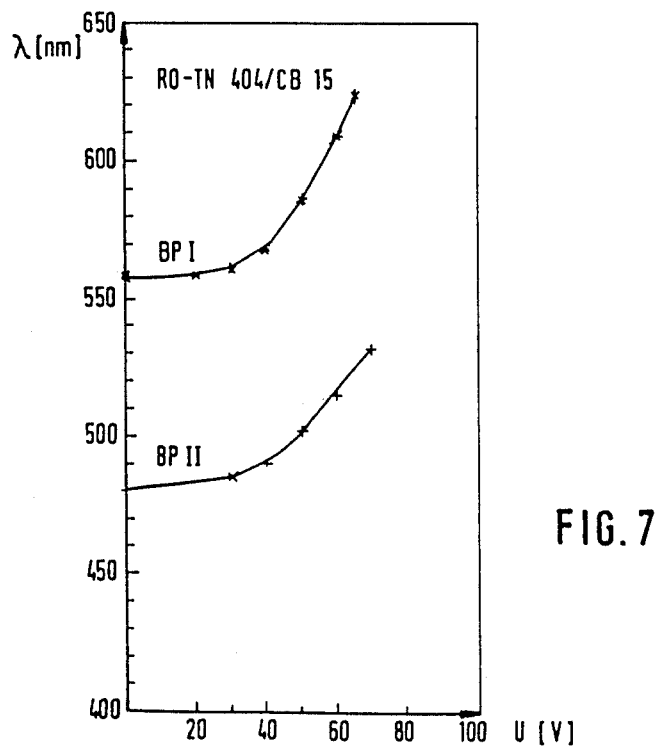
FIGS. 5, 6 and 7 show the functions, drawn in FIGS. 2, 3 and 4, for a further liquid crystal system.
Figure 5:
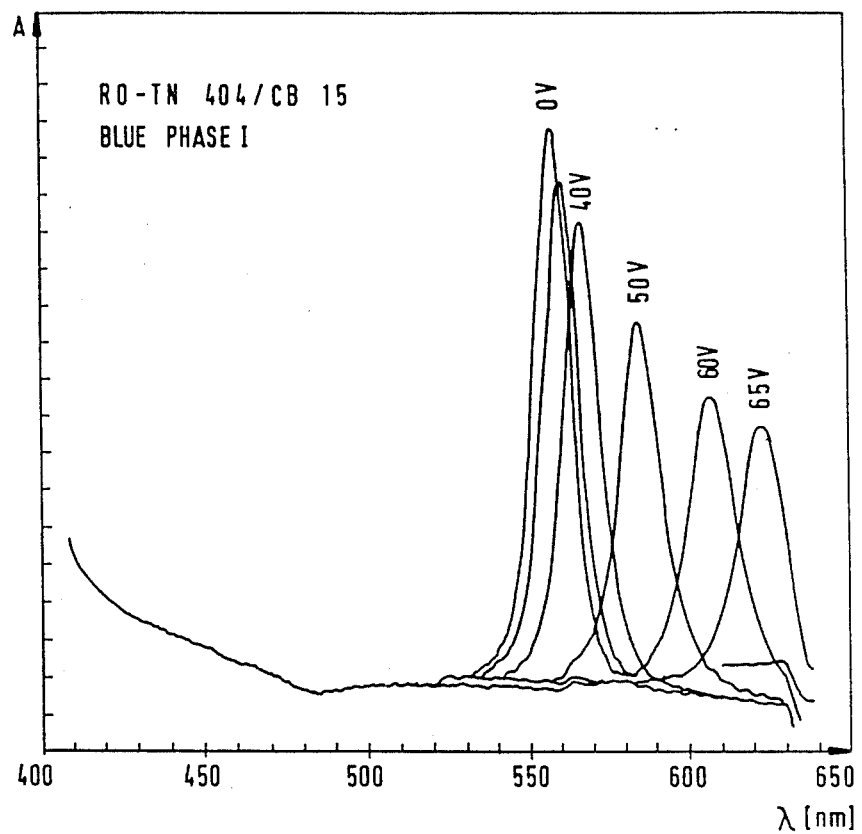
Figure 6:
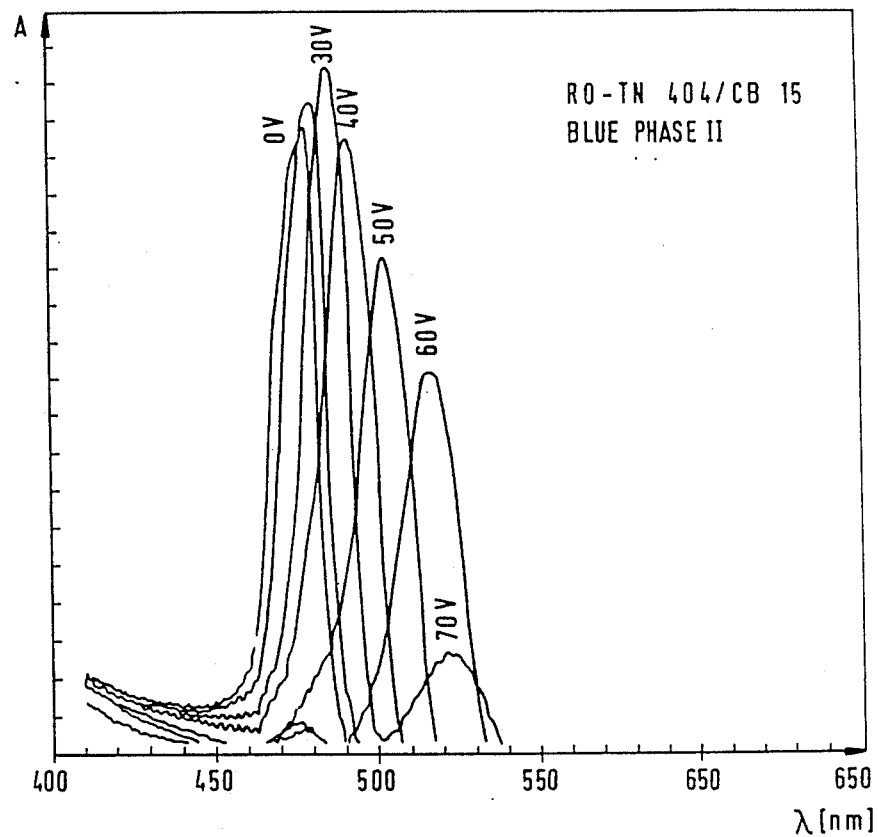

The absorption spectra of this mixture are plotted in FIGS. 5 and 6 which relate to the phases BPI and BPII respectively. FIG. 7 displays the $\lambda_{max}$/voltage curves, showing that, in the RO-TN 404/CB 15 system, the two color bands have moved somewhat closer together than in the ZLI 1612/CB 15 system.

All the measured results were reversible and insensitive to changes in the alternating voltage frequency, at least in the range between $10^2$ Hz and $10^3$ Hz. A disturbance by dielectric heating became noticeable only at higher frequencies, and hydrodynamic turbulence occurred at very low frequencies of about 10 Hz.

The invention is not restricted to the examples. Thus, the possibilities offered by a single BP modification are entirely sufficient in certain cases. If a particularly wide variety of colors is important, recourse can also be had to selective reflection by the cholesteric phase. Independently thereof, the liquid crystal layer can be modified with respect to certain properties; for example, it can have a $\Delta\epsilon$ which is positive or negative, or the sign of which is frequency-dependent. Moreover, an expert is at liberty to use the present polarizer, for example as an electro-optical component, for other purposes as well, for instance as an on/off switchable circular polarizer for monochromatic radiation sources, or as a displaceable frequency window in spectrographs, and to adapt it accordingly.

We claim:

1. A wavelength selection device comprising: a liquid crystal cell comprising two carrier plates, each of said carrier plates having electrically conductive coatings on their mutually facing sides, means for applying a variable voltage across said coatings, and a chiral liquid crystal layer in an optically isotropic blue phase enclosed between said plates, whereby said liquid crystal layer reflects electromagnetic radiation with a $\lambda_{max}$ dependent on the magnitude of said voltage.

2. A device of claim 1, further comprising means for impinging electromagnetic irradiation on at least one of said carrier plates.

3. A polarizer according to claim 1, wherein said blue phase layer comprises a liquid crystal having a pitch which corresponds to a desired wavelength within the visible light spectrum.

4. A device according to claim 2, wherein said blue phase layer comprises a liquid crystal having a pitch which corresponds to a desired wavelength within the visible light spectrum.

5. A device according to claim 1, further comprising a color-neutral circular polarizer on the side of said at least one carrier plate which is external to the blue phase layer enclosed between said plates, said color-neutral circular polarizer permitting only that light to pass through which is circularly polarized in the same sense as the light reflected by said blue phase, and said device transmitting light circularly polarized in the same sense as the reflected light, whereby the transmitted light has a variable stop band corresponding to the wavelength of the reflected light.

6. A device according to claim 4, further comprising a color-neutral circular polarizer on the side of said at least one carrier plate which is external to the blue phase layer enclosed between said plates, said color-neutral circular polarizer permitting only that light to pass through which is circularly polarized in the same sense as the light reflected by said blue phase, and said device transmitting light circularly polarized in the same sense as the reflected light, whereby the transmitted light has a variable stop band corresponding to the wavelength of the reflected light.

7. A device according to claim 1, wherein the electrically conductive coating on at least one of said carrier plates comprises segments capable of being individually activated electrically.

8. A device according to claim 2, wherein the electrically conductive coating on at least one of said carrier plates comprises segments capable of being individually activated electrically.

9. A device according to claim 1, further comprising a heating means effective to maintain said liquid crystal layer in a blue phase.

10. An optical system comprising a wavelength selective device according to claim 1 and a light source.

11. An optical system comprising a wavelength selection device according to claim 5 and a light source.

12. A device of claim 1, wherein said voltage is of a frequency in the audio range.

13. A device of claim 1, wherein said plates have an orientation layer adjacent said blue phase layer.

14. A method for selecting a desired $\lambda_{max}$ of light reflected from a blue hase of a liquid crystalline layer comprising varying an applied voltage across said blue phase to a magnitude which is effective to select said desired $\lambda_{max}$.

15. A method for reflecting circularly polarized light at a desired wavelength comprising impinging light on a liquid crystalline layer in a blue phase, said light comprising a component which is circularly polarized in the same sense as the molecular arrangement of the liquid crystalline layer in the blue phase, and applying a variable voltage across said liquid crystalline layer in the blue phase, wherein the desired wavelength of reflected circularly polarized light is determined by the voltage applied across said liquid crystalline layer.

16. A method according to claim 15, wherein said liquid crystalline layer is contained within a device comprising two carrier plates, each of said carrier plates having electrically conductive coatings on their mutually facing sides, means for applying a variable voltage across said coatings, and a chiral liquid crystal layer in an optically isotropic blue phase enclosed between said plates, whereby said liquid crystal layer reflects electromagnetic radiation with a $\lambda_{max}$ dependent on the magnitude of said voltage.

17. A method for transmitting circularly polarized light having a variable stop wavelength band within the spectrum of transmitted light comprising irradiating a device of claim 5 and applying a variable voltage across its blue phase layer.

* * * * *

UNITED STATES PATENT AND TRADEMARK OFFICE
CERTIFICATE OF CORRECTION

PATENT NO. : 4,818,076

DATED : April 4, 1989

INVENTOR(S) : Gerd Heppke et al

It is certified that error appears in the above-identified patent and that said Letters Patent is hereby corrected as shown below:

Column 7, line 51: reads "A polarizer according to claim 1, wherein said blue"

should read -- A device according to claim 1, wherein said blue --

Signed and Sealed this

Seventeenth Day of October, 1989

Attest:

DONALD J. QUIGG

Attesting Officer

Commissioner of Patents and Trademarks